United States Patent [19]
Cvetkovic et al.

[11] Patent Number: 6,141,536
[45] Date of Patent: Oct. 31, 2000

[54] DIVERSITY RADIO SYSTEM WITH RDS

[75] Inventors: Milan Cvetkovic, Rochester; David John McCall, Brentwood; Martin Gerard Page, South Woodham Ferrers, all of United Kingdom

[73] Assignee: Visteon Global Technologies, Inc., Dearborn, Mich.

[21] Appl. No.: 09/102,587

[22] Filed: Jun. 23, 1998

[51] Int. Cl.[7] .................................................. H04B 1/18
[52] U.S. Cl. .......................... 455/45; 455/134; 455/137; 455/273; 455/277.1
[58] Field of Search .................................. 455/45, 166.2, 455/167.1, 186.1, 185.1, 161.2, 166.1, 132, 133, 134, 135, 137, 140, 272, 273, 275, 277.1, 277.2, 278.1

[56] References Cited

U.S. PATENT DOCUMENTS

| | | | |
|---|---|---|---|
| 3,934,204 | 1/1976 | Hill | 455/136 |
| 4,210,871 | 7/1980 | Hill et al. | 455/137 |
| 4,742,563 | 5/1988 | Fukumura | 455/132 |
| 4,926,498 | 5/1990 | Suzuki et al. | 455/133 |
| 5,159,707 | 10/1992 | Mogi et al. | 455/134 |
| 5,303,400 | 4/1994 | Mogi | 455/167.1 X |
| 5,345,602 | 9/1994 | Wiedemann et al. | 455/137 |
| 5,345,606 | 9/1994 | Duckeck et al. | 455/185.1 X |
| 5,710,995 | 1/1998 | Akaiwa et al. | 455/277.2 |

FOREIGN PATENT DOCUMENTS

| | | |
|---|---|---|
| 0 221 475 | 5/1987 | European Pat. Off. |
| 1 373 644 | 11/1974 | United Kingdom . |
| 1 433 590 | 4/1976 | United Kingdom . |
| 2 257 605 | 1/1993 | United Kingdom . |

*Primary Examiner*—Fan Tsang
*Assistant Examiner*—Philip J. Sobutka
*Attorney, Agent, or Firm*—Mark L. Mollon

[57] ABSTRACT

An RDS receiver having dual tuners and dual antennas operates in two distinct modes, a diversity mode and a non-diversity mode. Diversity mode is when both tuners are tuned to a signal with the same program audio content and the audio from both tuners is blended together in a manner to minimize the effects of multipath distortion. In non-diversity mode, a forcing circuit isolates the tuner output signals so that one tuner provides the audio output while the other can be retuned to any other frequency for purposes of gathering RDS data.

15 Claims, 3 Drawing Sheets

DIVERSITY RADIO SYSTEM WITH RDS

BACKGROUND OF THE INVENTION

The present invention relates in general to RDS radios having dual tuners, and more specifically to a dual mode radio for operating in both a diversity and a non-diversity mode to minimize the effects of multipath distortion while maintaining efficient collection of RDS related information, including collecting signal quality data for RDS alternate frequencies.

Space diversity radio receiver systems can be employed to reduce the effects of multipath distortion in mobile receivers. Multipath distortion is a localized effect resulting from interaction between multiple signals from a single transmitter that have traversed different paths to reach a receiving antenna. By switching between spaced antennas in a diversity radio receiver, specific multipath events can be avoided since the spacing of the antennas helps insure that not both of the antennas will experience the same multipath event at the same time.

The prior art has also shown that separate tuners may be connected to each antenna and that the tuner output signals can be combined to provide improved diversity reception.

Separate tuners have also been employed in radio data system (RDS) receivers. In the case of RDS receivers, however, the tuners simultaneously receive at different frequencies. Standard RDS broadcasts transmit auxiliary digital data within the radio signal in order to achieve various automatic functions of the receiver. The data transmitted on a subcarrier includes alternate frequencies (AFs) at which the identical audio program can be heard. Thus, the receiver can automatically monitor AFs to determine whether a stronger or higher quality signal can be received by switching the tuner to a different frequency (e.g., as a vehicle moves relative to the broadcast transmitters). In an RDS receiver having just a single tuner, AFs can only be checked by briefly switching the tuner to an AF to detect its signal strength and then quickly returning to the original frequency before any detectable break is heard in the reproduction of the original broadcast. In RDS receivers having a second tuner, the second tuner is dedicated to collecting information about AFs (i.e., is not used for audio reproduction) and can monitor any alternate frequencies for as long as desired.

Based on the AF information which is collected and stored in memory in the receiver, the tuner which is reproducing audio signals can be switched to the strongest AF whenever the currently received signal becomes degraded. However, the response time required to detect signal degradation (such as a multipath event) and then to switch to an AF is too slow to prevent distortion from being heard. Thus, a dual tuner RDS radio system is needed which obtains RDS data gathering while providing improved immunity to multipath distortion.

SUMMARY OF THE INVENTION

The present invention provides a radio architecture and method of operation wherein maximum RDS operational flexibility is achieved in order to optimize RDS performance while obtaining immunity to multipath distortion using diversity reception.

In a primary aspect of the invention, a radio receiver for a mobile vehicle which is capable of receiving subcarrier data from broadcasts containing such data operates in either a diversity mode or a non-diversity mode. A first tuner produces a first tuner output signal in response to a broadcast signal at a first selected broadcast frequency. A second tuner produces a second tuner output signal in response to a broadcast signal at a second selected broadcast frequency. A signal mixer produces a mixed tuner output signal in response to the first and second tuner output signals. The signal mixer proportionally combines the tuner output signals when in the diversity mode according to relative measures of signal quality. The signal mixer isolates a selected one of the tuner output signals from the mixed tuner output when in the non-diversity mode. A data demodulator is responsive to either the first tuner output signal, the second tuner output signal, or the mixed tuner output signal to recover the subcarrier data. A control is coupled to the first and second tuners, the signal mixer, and the data demodulator and selects the diversity mode or the non-diversity mode in response to the signal quality. The control controls the first and second selected broadcast frequencies such that 1) the first and second selected broadcast frequencies each provide a user selected program when in the diversity mode, or 2) the selected one of the first and second tuner signals is searched for alternate frequency information and the other one of the first and second tuner output signals provides the user selected program when in the non-diversity mode.

DETAILED DESCRIPTION OF PREFERRED EMBODIMENTS

Figure 1:
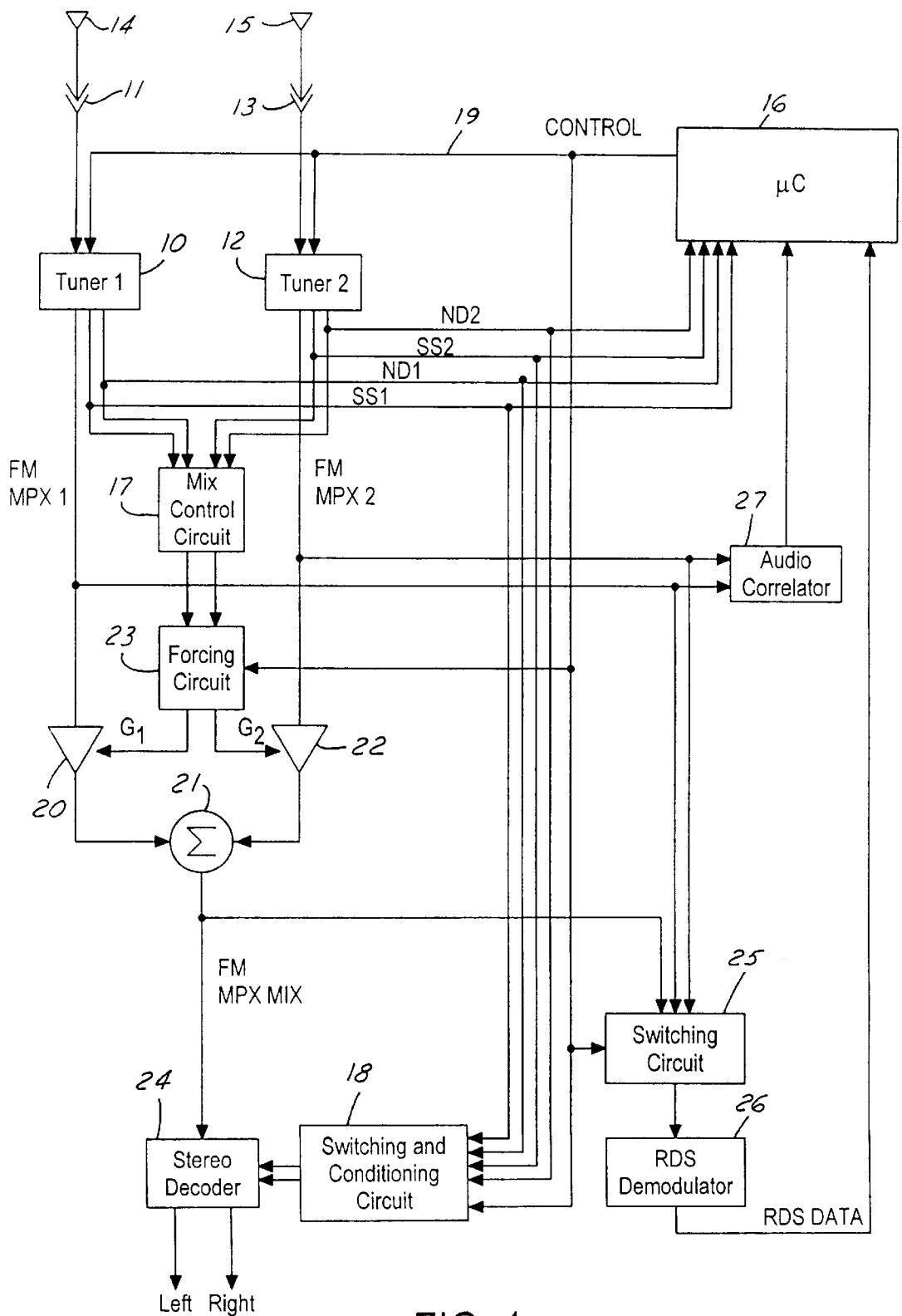
FIG. 1 is a block diagram showing the RDS diversity radio receiver of the present invention.

The RDS radio receiver shown in FIG. 1 operates in a diversity mode or in a non-diversity mode. In diversity mode, a pair of tuners are each tuned to the same user program (i.e., tuned to the same frequency) and their outputs are combined according to their signal strengths and the detection of multipath in order to minimize the effects of multipath distortion. In non-diversity mode, an audio output is reproduced from one tuner while the other tuner is used for scanning alternate frequencies to detect their signal quality and other data.

More specifically, the RDS diversity radio receiver includes a first tuner 10 with an antenna input 11 and a second tuner 12 with an antenna input 13. Antenna inputs 11 and 13 are preferably connected to spaced antennas 14 and 15 which are separated by a distance sufficient to avoid simultaneous multipath conditions at each antenna.

Tuners 10 and 12 are controlled by a microcontroller 16 via a control bus 19. Tuner 10 generates an FM multiplex tuner output signal designated FM MPX 1, a signal strength signal SS1, and a noise detection signal ND1. Tuner 12 generates a tuner output signal FM MPX 2, signal strength signal SS2, and noise detection signal ND2. Signals SS1, ND1, SS2, and ND2, are all connected to a mix control circuit 17, microcontroller 16, and a switching and conditioning circuit 18. The FM MPX 1 signal from tuner 10 is provided through a voltage-controlled amplifier 20 to one input of a summer 21. The FM MPX 2 signal from tuner 12 is provided through a voltage-controlled amplifier 22 to a second input of summer 21.

Mix control circuit 17 provides a pair of gain control signals $G_1$ and $G_2$ through a forcing circuit 23 to amplifiers 20 and 22, respectively. Forcing circuit 23 receives a control signal from microcontroller 16 vis control bus 19 to select between the diversity and non-diversity modes as will described described below.

The output of summer 21 provides an FM MPX MIX signal to a stereo decoder 24 and to a switching circuit 25. The output from stereo decoder 24 provides left and right decoded stereo signals for reproduction. Switching circuit 25 also receives as inputs the multiplex signals FM MPX 1 and FM MPX 2 from tuners 10 and 12. Switching circuit 25 receives a control signal from control bus 19 which selects between the FM MPX 1, FM MPX 2 and FM MPX MIX signals for input to an RDS demodulator 26. RDS data recovered by demodulator 26 is provided to microcontroller 16.

Tuner output signals FM MPX 1 and FM MPX 2 are also provided to an audio correlator 27 which determines whether the audio content is identical on the two tuner output signals. Based on a comparison of the two signals, correlator 27 provides an indicating signal to microcontroller 16 to identify whether the audio content is the same.

In operation, the radio receiver of FIG. 1 operates in either a diversity mode or a non-diversity mode under control of microcontroller 16. When in diversity mode, tuners 10 and 12 are preferably tuned to the same frequency to receive the same user selected program from both antennas 14 and 15 so that the received signals can be combined in a manner which avoids multipath distortion. As described in co-pending application serial number (198-0140), which is incorporated herein by reference, mix control circuit 17 is responsive to multipath conditions to provide gain control signals $G_1$ and $G_2$ to mix the relative contribution of the tuner output signals to the final mixed tuner output signal so that the proportion of each individual output signal in the mixed signal is inversely proportional to the likelihood of multipath in that signal. Thus, tuners 10 and 12 each generate a respective signal strength (SS) signal and a respective noise detection (ND) signal. The noise detection signal may be derived, for example, by bandpass filtering the demodulated tuner output signal with a bandpass from about 100 kHz to about 500 kHz (which measures noise and distortion from multipath and other noise sources). Gain control signal $G_1$ as supplied to amplifier 20 tends to increase with increased signal strength SS1 in tuner 10 and tends to decrease with increasing noise content ND1. Likewise, gain control signal G2 increases with increasing signal strength SS2 from tuner 12 and decreases with increasing noise content ND2. When in the diversity mode, forcing circuit 23 directly passes gain control signals $G_1$ and $G_2$ from mix control circuit 17 to amplifiers 20 and 22.

Also when in diversity mode, switching circuit 25 selects the combined output from summer 21 (i.e., the FM MPX MIX signal) for input into RDS modulator 26 to assure the best quality signal for recovering RDS data for the user selected program.

When microcontroller 16 determines that the receiver should be in non-diversity mode, the elements of FIG. 1 are reconfigured so that one selected tuner is used to search for predetermined alternate frequency information in the RDS signal (e.g., determining the quality of each available AF or detecting RDS data at each AF) and the other tuner is used to reproduce the user selected program. In non-diversity mode, microcontroller 16 configures forcing circuit 23 in a way which forces one of amplifiers 20 or 22 to have a maximum gain and the other amplifier to have a minimum gain. Thus, the tuner which is selected as the RDS tuner can then be retuned to any other frequency in order to gather RDS data or signal strength or other information at alternate frequencies without this action affecting the audio quality of the other tuner providing the audio output of the receiver. Also while in non-diversity mode, microcontroller 16 configures switching circuit 25 to couple the selected tuner output to RDS demodulator 26. The selection of which tuner to use as the RDS alternate frequency tuner can be arbitrary or may be done according to an optimized method such as the one discussed below in connection with FIG. 6.

Switching and conditioning circuit 18 operates in a conventional manner to introduce high-cut and stereo blend in stereo decoder 24 in response to signal strength SS and noise detection ND in tuners 10 and 12. This helps eliminate any residual multipath distortion during diversity mode and improves signal reproduction during any multipath events that occur during non-diversity mode.

Figure 2:
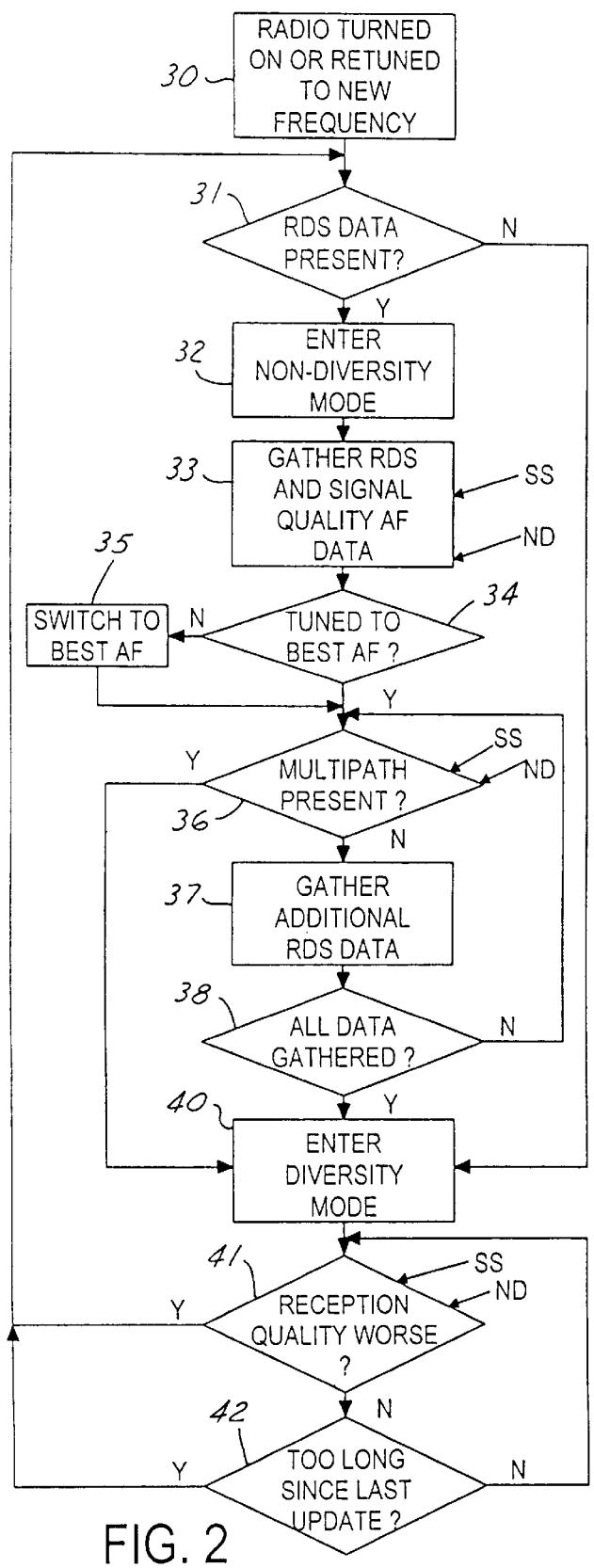
FIG. 2 is a flowchart showing the operation of the receiver of FIG. 1.

A preferred method for coordinating receiver operation between diversity and non-diversity modes is shown in FIG. 2. The method begins at block 30 when the radio receiver is either turned on or when it is manually retuned to a new frequency by the user. In step 31, a check is made to determine whether RDS data is present within the currently tuned-in broadcast. If no RDS data is present, then the tuner enters diversity mode in step 40. If the station being listened is not an RDS broadcast, then the receiver can spend full time in diversity mode.

If RDS data is present in step 31, then the receiver initially enters non-diversity mode in step 32. While in non-diversity mode, microcontroller 16 gathers RDS data at the selected broadcast frequency including alternate frequencies carrying the same broadcast audio program. Signal quality of the AFs is collected and stored in memory based on signal strength and noise detection at each AF in step 33. After signal quality is gathered for all the AFs, a check is made in step 34 to determine whether the manually selected or current frequency is the best (i.e., strongest) one to receive. If not, then a switch is made to that best AF in step 35.

In step 36 (while still in non-diversity mode), a check is made to determine whether a multipath event is present by examining signal strength and noise detection signals. If a multipath event is detected in step 36, then the receiver enters diversity mode in step 40. If no multipath event is detected, then additional lower priority RDS data may be collected and/or monitored in step 37. In step 38, a check is made to determine whether all possible RDS data has been gathered. If not, then a return is made to step 36. Otherwise, the receiver enters diversity mode in step 40. Thus, under good signal conditions (indicated by the tuner SS and ND signals), the receiver can spend as much time as necessary gathering RDS data.

After entering diversity mode in step 40, the receiver checks for worsening reception quality in step 41. At the point where reception quality worsens to an unacceptable level, a return is made to step 31 which allows the receiver to reenter non-diversity mode if RDS data is present, thereby allowing a search to be conducted for a better signal at an alternate frequency. If reception quality has not worsened in step 41, then a check is made in step 42 to determine whether a predetermined period of time has passed (e.g., several minutes) in which reception quality of alternate frequencies may have changed and the memory of the receiver should be updated. If the predetermined delay has not expired, then a return is made to step 41 and the receiver remains in diversity mode. If the predetermined delay has passed, then a return is made to step 31.

Figure 3:
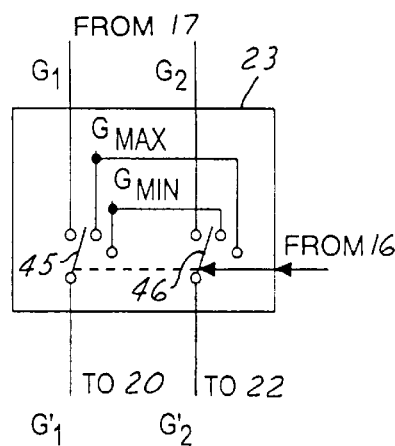
FIG. 3 is a schematic diagram showing the forcing circuit of FIG. 1 in greater detail.

FIG. 3 shows forcing circuit 23 in greater detail. A pair of multiplexers 45 and 46 receive gain control signals $G_1$ and $G_2$, respectively, from mix control circuit 17. A maximum gain signal $G_{max}$ and a minimum gain control signal $G_{min}$ are provided to additional multiplexer inputs as shown. The outputs of multiplexers 45 and 46 provide modified gain control signals $G'_1$ and $G'_2$ as determined by control signals from microcontroller 16. Thus, either gain control signals $G_1$ and $G_2$ are passed unchanged, or $G_1$ is forced to maximum gain while $G_2$ is forced to minimum or no gain, or $G_1$ is forced to minimum gain while $G_2$ is forced to maximum gain depending upon the control signals.

Figure 4:
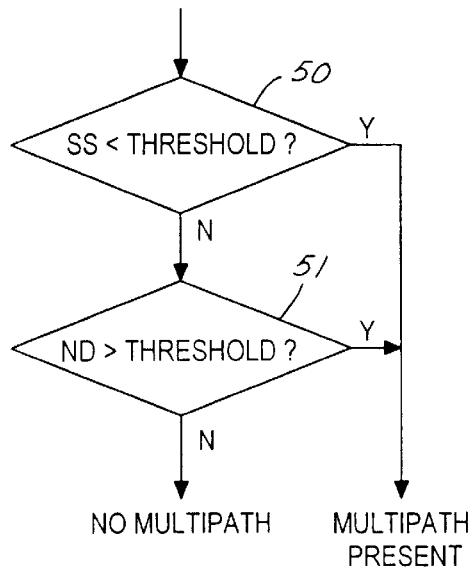
FIG. 4 is a flowchart showing the detection of multipath as performed by the controller of FIG. 1.

FIG. 4 shows one embodiment for detecting multipath in step 36 of FIG. 2. In step 50, signal strength SS (from the tuner being used to provide the audio reproduction) is compared with a predetermined signal strength threshold. If instantaneous signal strength falls below this threshold, then a multipath event is detected. Otherwise, a check is made in step 51 to determine whether the noise detection signal indicates an amount of noise present greater than a predetermined noise threshold. If the threshold is exceeded then multipath is present, otherwise there is no multipath event taking place. Many other ways are known in the art for detecting a multipath event and any may be acceptable for purposes of this invention.

Figure 5:
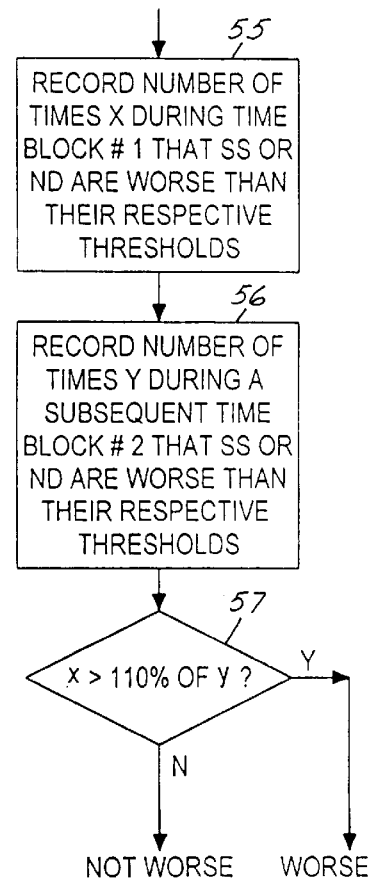
FIG. 5 is a flowchart showing the detection of worsening reception conditions as performed by the controller of FIG. 1.

FIG. 5 shows one embodiment of a method for detecting worsening reception quality as used in step 41 of FIG. 2. Likewise, many other acceptable methods could be used for determining when reception quality has worsened. In this preferred embodiment, average signal quality (SQ) for a current time period is compared with average SQ for a previous time period. Signal quality as used herein means a determination based upon signal strength SS, noise detection ND, or both. Noise added to a signal may consist of multipath distortion or other noise such as intermodulation or adjacent channel noise. In the preferred embodiment, signal quality is measured in direct proportion to signal strength ss and in inverse proportion to noise detection ND. Signal quality can be determined by counting how many times signal strength SS and noise detection signal ND cross their respective thresholds during a specified time period.

In step 55, a number of times, x, that SS and/or ND are worse than their respective thresholds during a time block #1 is recorded. In step 56, a number of times, y, that SS and/or ND are worse than their respective thresholds during a time block #2 is recorded. Time blocks #1 and #2 are of equal time (each on the order of at least several seconds) and are consecutive. The values of x and y are indicators of signal quality SQ wherein the lower the value of x or y, the higher the signal quality. A check is made in step 57 to determine whether the count of threshold crossings has increased by 10 percent (i.e., whether x>110% of y). If so, then the signal quality has unacceptably worsened and a search for a new broadcast frequency can be initiated. Otherwise, a determination is made that reception quality has not worsened and is still acceptable. It may also be desirable to compare running averages of SS and ND with their respective thresholds to also detect unacceptable or worsened conditions.

Figure 6:
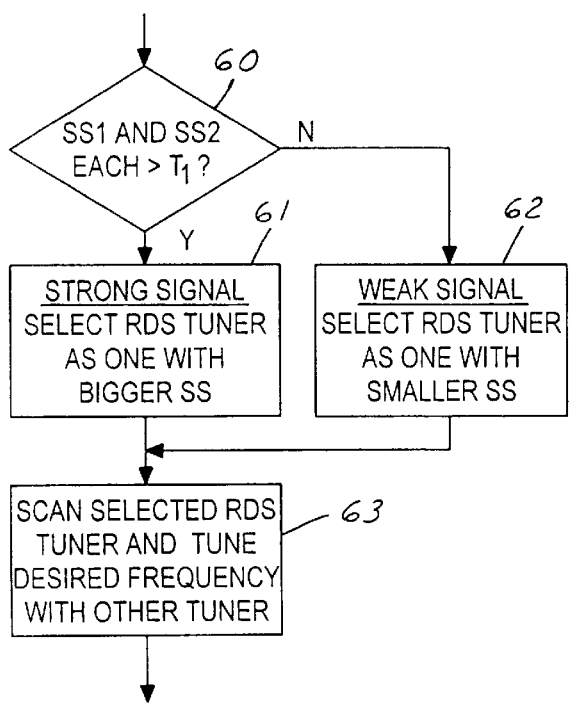
FIG. 6 is a flowchart showing a method for selecting which of the two tuners to use for scanning RDS alternate frequency signal quality and data.

In a typical vehicle installation, although tuners 10 and 12 have substantially identical electrical characteristics, antennas 14 and 15 will not have identical electrical properties for a variety of reasons. Aesthetic and styling requirements dictate the kind of antennas used and where they are placed on the vehicle. Commonly used types of antennas include a whip antenna mounted on a vehicle panel or roof, and an on-glass antenna. Since the antennas will most often differ in gain and radiation patterns, the signal strength received by the tuners will vary from each other even when multipath or other noise is not present. Although it may be possible to designate one tuner as a main tuner and the other as a subsidiary tuner, it may not be possible to know in advance which tuner input is likely to be connected to the better antenna. Thus, a further method is provided for selecting which tuner to use as the RDS tuner and which to use as the audio program reception tuner when entering non-diversity mode as shown in FIG. 6. In general, under strong signal conditions, it may be desirable to use the strongest signal to perform RDS data gathering since the audio signal from the other tuner is then of good quality. However, whenever medium or weak signal conditions are present, it is generally desirable to use the stronger signal for audio reproduction and use the weaker signal for RDS data gathering. Thus, a check is made in step 60 to determine whether signal strength signals SS1 and SS1 are each greater than a threshold $T_1$. If both are greater than the threshold then a strong signal is detected in step 61 and the RDS tuner is selected as the one with the bigger signal strength signal. Otherwise, a weak signal is detected in step 62 and the RDS tuner is selected as the one with the smaller signal strength signal. Non-diversity mode is entered in step 63 wherein the selected RDS tuner is scanned tuned while the other tuner is tuned to the desired frequency for the selected program.

Yet another advanced feature of the present invention relates to making a completely smooth, inaudible transition when switching between alternate frequencies. In prior art receivers, an audible click or transient can often be heard during retuning to the new frequency. In the present invention, the forcing circuit can be modified to provide ramping signals for controlling the gain control signals to smoothly transition reproduction from one tuner to the other. Before performing such a transition, however, the receiver needs to verify that the content at each frequency is the same. Thus, even though the program information (PI) RDS code may indicate that the two frequencies have the same program audio, there are instances where the program audio may in fact be different. Furthermore, in some instances under weak signal conditions, the RDS decoder may have difficulty obtaining the PI code or may take an unacceptably long period of time to obtain the PI code. Thus, audio correlator 27 in FIG. 1 is used to verify identical program audio. Audio correlator 27 is a known circuit for indicating whether or not the two multiplex signals have their inputs correlated.

Figure 7:
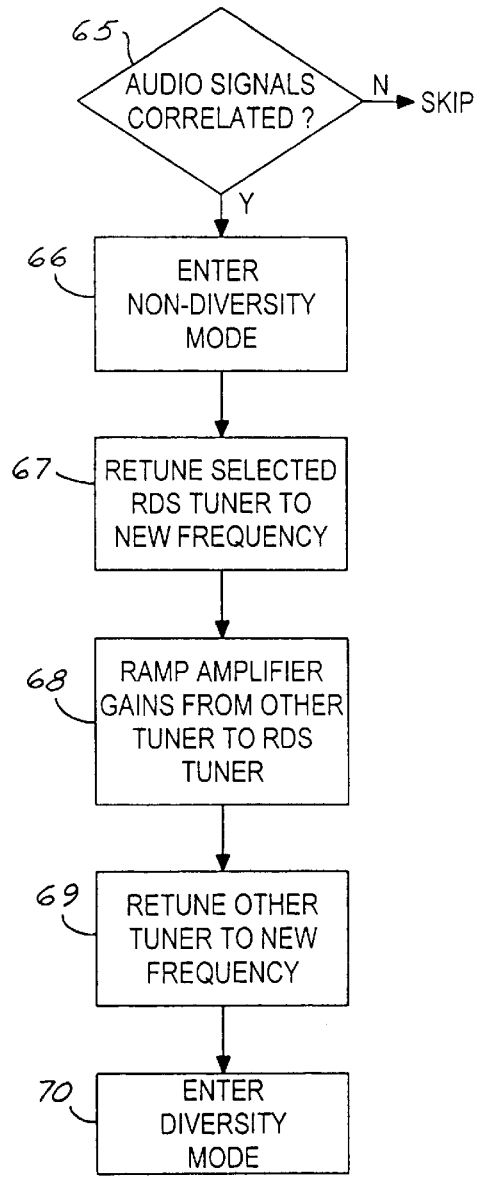
FIG. 7 is a flowchart showing a method for switching a reception frequency from a current frequency to a new alternate frequency.

As shown in FIG. 7, a check is made in step 65 to determine whether the audio signals are correlated. If the signals are not correlated, then the transitioning between alternate frequencies is skipped. Otherwise, the receiver enters non-diversity mode in step 66. In step 67, the selected RDS tuner is retuned to the new frequency. Then, the amplifier gains are ramped in step 68 such that audio reproduction transitions from the other tuner to the selected RDS tuner. In step 69, the other tuner is retuned to the new frequency and the receiver enters diversity mode in step 70.

What is claimed is:

1. A radio receiver for a mobile vehicle wherein said receiver is capable of receiving subcarrier data from broadcasts containing said data, and wherein said receiver operates in either a diversity mode or a non-diversity mode, said receiver comprising:

a first tuner producing a first tuner output signal in response to a broadcast signal at a first selected broadcast frequency, and providing a first signal strength signal;

a second tuner producing a second tuner output signal in response to a broadcast signal at a second selected broadcast frequency, and providing a second signal strength signal;

a signal mixer producing a mixed tuner output signal in response to said first and second tuner output signals, said signal mixer proportionally combining said first and second tuner output signals when in said diversity mode according to relative measures of signal quality, and said signal mixer isolating a selected one of said first and second tuner output signals from said mixed tuner output when in said non-diversity mode;

a data demodulator responsive to either said first or second tuner output signal or said mixed tuner output signal to recover said subcarrier data; and a control coupled to said first and second tuners, said signal mixer and said data demodulator, said control selecting said diversity mode or said non-diversity mode in response to said signal quality, said control controlling said first and second selected broadcast frequencies such that 1) said first and second selected broadcast frequencies each provide a user selected program when in said diversity mode, or 2) said selected one of said first and second tuner output signals is searched for predetermined alternate frequency information according to said subcarrier data and the other one of said first and second tuner output signals provides said user selected program when in said non-diversity mode, wherein said control includes threshold means for comparing at least one of said signal strength signals with a threshold, and wherein selection of said selected one of said first and second tuner output signals is made in response to said comparison by said threshold means.

2. The radio receiver of claim 1 wherein said control includes a quality detector determining said signal quality in response to received signal strength and distortion.

3. The radio receiver of claim 2 wherein said distortion is comprised of multipath distortion.

4. The radio receiver of claim 2 wherein said distortion is comprised of noise.

5. The radio receiver of claim 1 wherein said first and second tuners each includes its own respective external antenna connection.

6. The radio receiver of claim 1 wherein said selected one of said first and second tuner output signals is the one having a greater signal strength signal when said comparison indicates a signal strength above said threshold, and wherein said selected one of said first and second tuner output signals is the one having a lesser signal strength signal when said comparison indicates a signal strength below said threshold.

7. The radio receiver of claim 1 wherein said first and second selected broadcast frequencies are the same during said diversity mode.

8. The radio receiver of claim 7 wherein said control transitions said receiver from an original broadcast frequency to a new broadcast frequency containing the same user selected program by 1) entering said non-diversity mode, 2) retuning said selected one of said first and second tuner output signals to said new broadcast frequency, 3) ramping said mixed tuner output signal from said other one of said first and second tuner output signals to said selected one of said first and second tuner output signals, 4) retuning said other one of said first and second tuner output signals to said new broadcast frequency, and 5) entering said diversity mode.

9. The radio receiver of claim 8 further comprising an audio correlator comparing said first and second tuner output signals and producing an indicating signal when said first and second tuner output signals are verified to contain said same user selected program, wherein said control transitions to said new broadcast frequency only if said indicating signal is present.

10. A method of mobile radio reception in a mobile receiver capable of receiving subcarrier data from broadcasts containing said data, and wherein said receiver operates in either a diversity mode or a non-diversity mode, said method comprising the steps of:

producing a first tuner output signal from a first tuner in response to a broadcast signal at a first selected broadcast frequency;

generating a first signal strength signal in said first tuner;

producing a second tuner output signal from a second tuner in response to a broadcast signal at a second selected broadcast frequency;

generating a second signal strength signal in said second tuner;

comparing at least one of said signal strength signals with a threshold;

combining said first and second tuner output signals to produce a mixed tuner output signal, wherein said first and second tuner output signals are proportionally combined when in said diversity mode according to relative measures of signal quality, and wherein a selected one of said first and second tuner output signals is isolated from said mixed tuner output signal when in said non-diversity mode, said selected one of said first and second tuner output signals being selected in response to said comparison;

recovering said subcarrier data in response to either said first and second tuner output signals of said mixed tuner output signal to recover said subcarrier data;

selecting said diversity mode or said non-diversity mode in response to said signal quality; and setting said first and second selected broadcast frequencies such that 1) said first and second selected broadcast frequencies each provide a same user selected program when in said diversity mode, or 2) said selected one of said first and second tuner output signals is searched for predetermined alternate frequency information according to said subcarrier data and the other one of said first and second tuner output signals provides said user selected program when in said non-diversity mode.

11. The method of claim 10 wherein said signal quality is determined in response to received signal strength and distortion.

12. The method of claim 10 wherein said selected one of said first and second tuner output signals in said non-diversity mode is the one having a greater signal strength signal when said comparison indicates a signal strength above said threshold, and wherein said selected one of said first and second tuner output signals in said non-diversity mode is the one having a lesser signal strength signal when said comparison indicates a signal strength below said threshold.

13. The method of claim 10 wherein said first and second selected broadcast frequencies are the same during said diversity mode.

14. The method of claim 13 wherein said receiver transitions from an original broadcast frequency to a new broadcast frequency containing the same user selected program, said method further comprising the steps of:

entering said non-diversity mode;

retuning said selected one of said first and second tuner output signals to said new broadcast frequency;

ramping said mixed tuner output signal from said other one of said first and second tuner output signals to said selected one of said first and second tuner output signals;

retuning said other one of said first and second tuner output signals to said new broadcast frequency; and entering said diversity mode.

15. The method of claim 14 further comprising the step of:

comparing said first and second tuner output signals in an audio correlator to produce an indicating signal when said first and second tuner output signals are verified to contain said same user selected program;

wherein said receiver transitions to said new broadcast frequency only if said indicating signal is present.

* * * * *